United States Patent [19]
Tate et al.

[11] Patent Number: 5,169,653
[45] Date of Patent: Dec. 8, 1992

[54] LABEL TRANSFER MECHANISM FOR BLOW MOLDING MACHINERY

[75] Inventors: Dennis J. Tate, Grass Lake; John R. Francis, Saline, both of Mich.

[73] Assignee: Hoover Universal, Inc., Plymouth, Mich.

[21] Appl. No.: 734,144

[22] Filed: Jul. 22, 1991

[51] Int. Cl.⁵ .............................................. B29C 49/24
[52] U.S. Cl. .............................. 425/503; 156/DIG. 31; 264/509; 271/11; 271/91; 425/504; 425/522
[58] Field of Search ............ 425/503, 504, 522; 271/11, 90, 91; 264/509, 511, 516; 156/DIG. 31

[56] References Cited

U.S. PATENT DOCUMENTS

| | | | |
|---|---|---|---|
| 3,292,209 | 12/1966 | Borkmann | 425/126.1 |
| 3,556,514 | 1/1971 | Stockmann | 264/22 X |
| 4,397,625 | 8/1983 | Hellmer et al. | 425/503 X |
| 4,479,770 | 10/1984 | Slat et al. | 425/503 |
| 4,479,771 | 10/1984 | Slat et al. | 425/503 |
| 4,636,166 | 1/1987 | Franks et al. | 425/503 |
| 4,639,206 | 1/1987 | Darr | 425/503 |
| 4,680,000 | 7/1987 | Nowicki et al. | 425/504 X |
| 4,721,451 | 1/1988 | Darr | 425/503 |
| 4,787,833 | 11/1988 | Krall | 425/503 X |
| 4,802,832 | 2/1989 | Shapler | 425/504 X |
| 4,815,955 | 3/1989 | Krall | 425/503 X |
| 5,026,266 | 6/1991 | Takasaki et al. | 425/503 X |
| 5,067,890 | 11/1991 | Dunlap et al. | 425/522 X |

Primary Examiner—Richard L. Chiesa
Attorney, Agent, or Firm—Harness, Dickey & Pierce

[57] ABSTRACT

A label transfer assembly providing for in-mold labeling of blow molded articles in blow molding machinery. A label carrier is utilized which includes means for individually receiving labels from a label storage magazine. Once loaded with labels, the label carrier is moved to a position adjacent a placement assembly. The labels are removed from the carrier by the placement assembly which includes arms that transfer the labels to positions in mold cavities in the machinery. During molding, the labels will become fused to the surfaces of the blow molded articles.

19 Claims, 4 Drawing Sheets

LABEL TRANSFER MECHANISM FOR BLOW MOLDING MACHINERY

BACKGROUND OF THE INVENTION

This invention relates generally to blow molding machines and particularly to a label transfer mechanism for transferring labels from a label storage magazine to an article forming mold cavity where the labels become molded into the formed article.

Blow molding machines are used to produce various articles including containers for household chemicals, beverages and other substances. In a typical blow molding process, a pair of mold halves are clamped together around a tube of molten thermoplastic material, known as a parison. The parison is then inflated by gas pressure so as to conform with the mold cavity. Frequently, labels are applied to the containers for product identification, instruction, warning, etc.

In the past, formed containers were sent to a separate work station where the labels were adhesively bonded to the container. More recently, however, a class of blow molding machines have been developed having in-mold labeling capabilities. In these machines, labels are transferred from a storage magazine and deposited directly into the mold cavity prior to forming of the article. Vacuum ports, within the mold halves, maintain the labels in position as the molds are clamped around the molten parison and the parison is inflated.

When the parison is inflated, the labels become thermally bonded to the container outer surface. This process of in-mold labeling provides a label which is durable and less likely to peel-off the container. More importantly, the finished container is aesthetically desirable since the label is molded flush with the container surface.

In accordance with this invention, a transfer assembly for an in-mold labeling machine is provided having a rotatable label carrier. The carrier indexes or stops periodically during rotation. The number of indexed positions associated with the carrier corresponds to the number of labeling stations employed in the particular production set-up.

As the carrier is indexed, labels, held in a label storage magazine, are transferred to positions on the label carrier where they are held by vacuum cups. The loaded carrier is next moved and indexed along a placement assembly where vacuum heads, mounted on the distal end of a placement arm, are pivoted between a retracted position and a position in registry with one of the labels so as to remove the label from the carrier. The carrier is then indexed and moved to the next station.

The moving and indexing of the carrier is successively repeated resulting in the labels being transferred from the carrier to each of the vacuum heads of the placement assembly. Once the carrier has moved past the placement assembly, the placement arm is raised upwardly and extended to place the labels onto the inner surface of the mold cavities where the labels are maintained by vacuum ports. The placement arm is retracted as the blow molding sequence begins.

During blow molding, platens cause the mold halves to be clamped together around a molten parison. The parison is inflated to conform to the mold cavity thereby forming the article and fusing the labels to the article outer surface.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
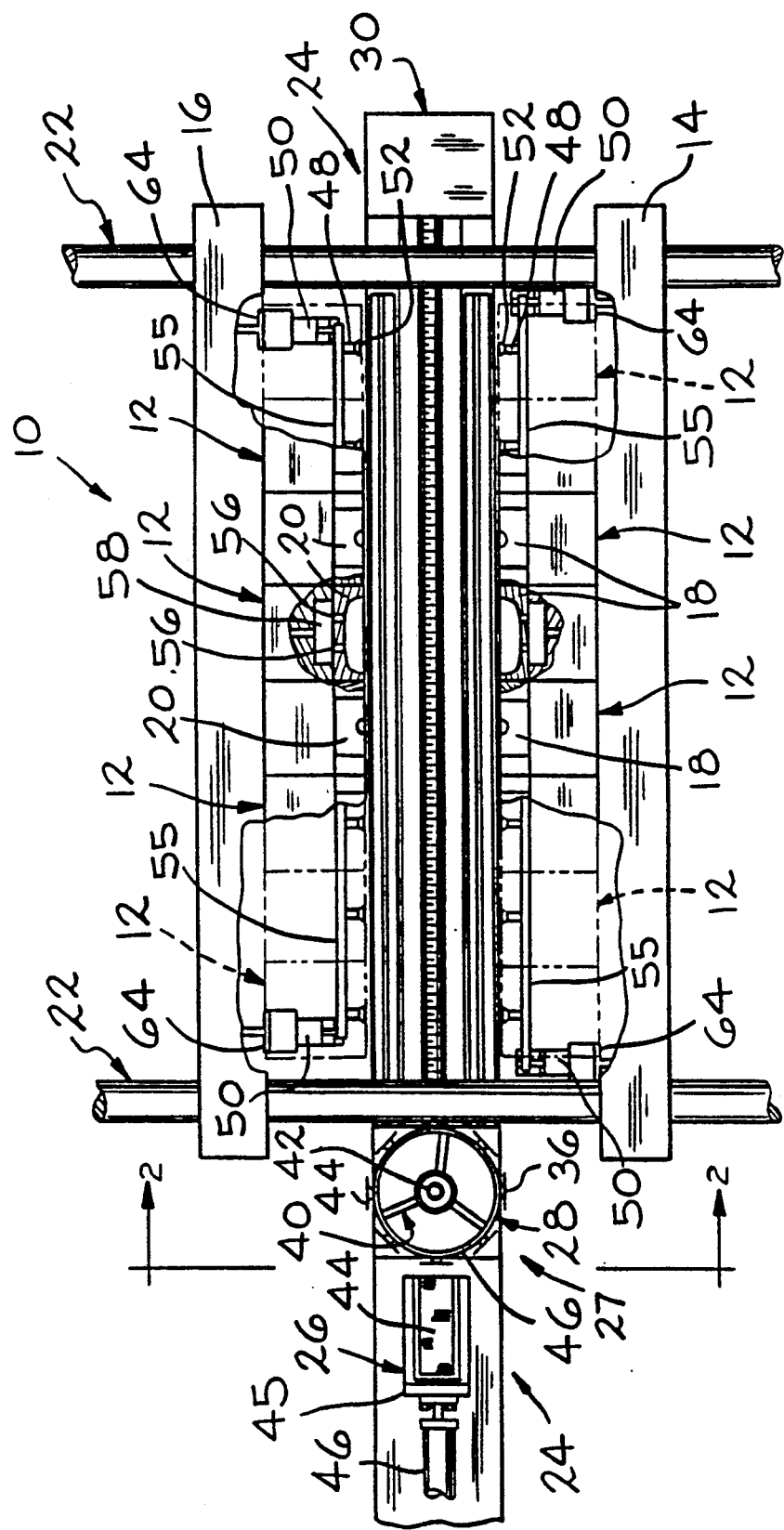
FIG. 1 is a plan view of a blow molding machine to which the principles of the present invention have been adapted.

Referring now to the drawing, FIG. 1 illustrates a blow molding machine having an embodiment of the present invention adapted thereto. The blow molding machine is generally designated by reference number 10 and includes eight blow molding stations 12. The actual number of blow stations 12 is not intended to be limited to the illustrated embodiment and, in practice, will be determined by production considerations.

Each blow molding station 12 includes a pair of oppositely positioned platens 14 and 16 which respectively carry mold halves 18 and 20. The platens 14 and 16 are mounted on an upper carriage assembly 22 which moves the mold halves 18 and 20 between a separated position (shown in the Figures) and a clamped together position during actual molding.

The mold halves 18 and 20 can be configured to form an almost endless variety of articles. Herein they are shown as forming containers which can be used for various purposes, such as storing dry products, beverages or other liquid products. As the skilled artisan will appreciate, the blow molding stations 12 can be adapted for blow molding processes utilizing either parisons or preforms.

The blow molding machine 10 is provided with a label transfer mechanism generally designated at 24. In the present embodiment the label transfer mechanism 24 is positioned below the blow molding stations 12 of the blow molding machine 10. It will be appreciated that variations on the illustrated set-up may be utilized to incorporate the principles of the present invention.

Generally, the labeling transfer mechanism 24 includes a label storage magazine 26, a transfer assembly 27 including a carrier or transfer drum 28 and a lower carriage 30, and a placement assembly 32.

In the preferred embodiment, the transfer drum 28 is cylindrical and includes two vertically spaced rows of suction or vacuum cups of a type known within the industry. The vacuum cups of the upper row will be hereinafter designated by reference number 36 while the vacuum cups of the lower row will be designated by reference number 38. The vacuum cups 36 and 38 are positioned around the transfer drum 28 and are provided in a number which corresponds to the number of blow molding stations 12 and the number of labels needing to be transferred thereto.

The vacuum cups 36 and 38 are in communication with a vacuum source (not shown) through a vacuum duct system 40 provided in the transfer drum 28. As further described below, a stepping motor 42 or other rotation mechanism is provided to rotate the transfer drum 28, stopping rotation at indexed positions corresponding to the positions of the vacuum cups 36 and 38.

The label storage magazine 26 is of a type known within the labeling art. Typically, a large number of labels 44 are horizontally stacked and stored in the label storage magazine 26. Pushing the stack of labels 44 against one end of the label storage magazine 26 is a movable fence 45. A pneumatic cylinder 46, or other device providing a constant force, is used to act on the fence 45 and exert a uniform force on the stack of labels 44, irrespective of the number of labels 44 retained therein. The labels 44 are advanced so that the individual label 44 at the end of the stack, opposite of the fence 45, engages a vacuum cup 36 or 38, which upon the supplying of a vacuum, removes the label 44 from the label storage magazine 26.

By indexing the transfer drum 28, the two rows of vacuum cups 36 or 38 may be completely loaded with labels 44. In the preferred embodiment, a single label storage magazine 26 is used and is raised or lowered to transfer labels 44 to the appropriate row of vacuum cups 36 and 38. Alternatively, the invention may be provided with two label storage magazines 26, one being operable with the upper row of vacuum cups 36 and the other being operable with the lower row of vacuum cups 38.

Once fully loaded with labels 44, the transfer drum 28 is longitudinally moved by the carriage 30 along the placement assembly 32 which independently operates with the molding stations 12. In the illustrated embodiment, placement assemblies 32 are provided so as to operate with opposing sides of the transfer drum 28. One placement assembly 32 is operable with the labels 44 held by the lower vacuum cups 38 and is therefore positioned slightly lower than the opposing placement assembly 32, which is operable with the labels 44 held by the upper vacuum cups 36. In this manner, the transfer drum 28 allows for both front and rear labels 44 to be readily incorporated into the finished article, e.g. front labels 44 may be held by the upper vacuum cups 36 while rear labels 44 may be held by the lower vacuum cups 38 with the front and rear labels 44 being positioned into opposing mold halves 18 and 20.

Figure 2:
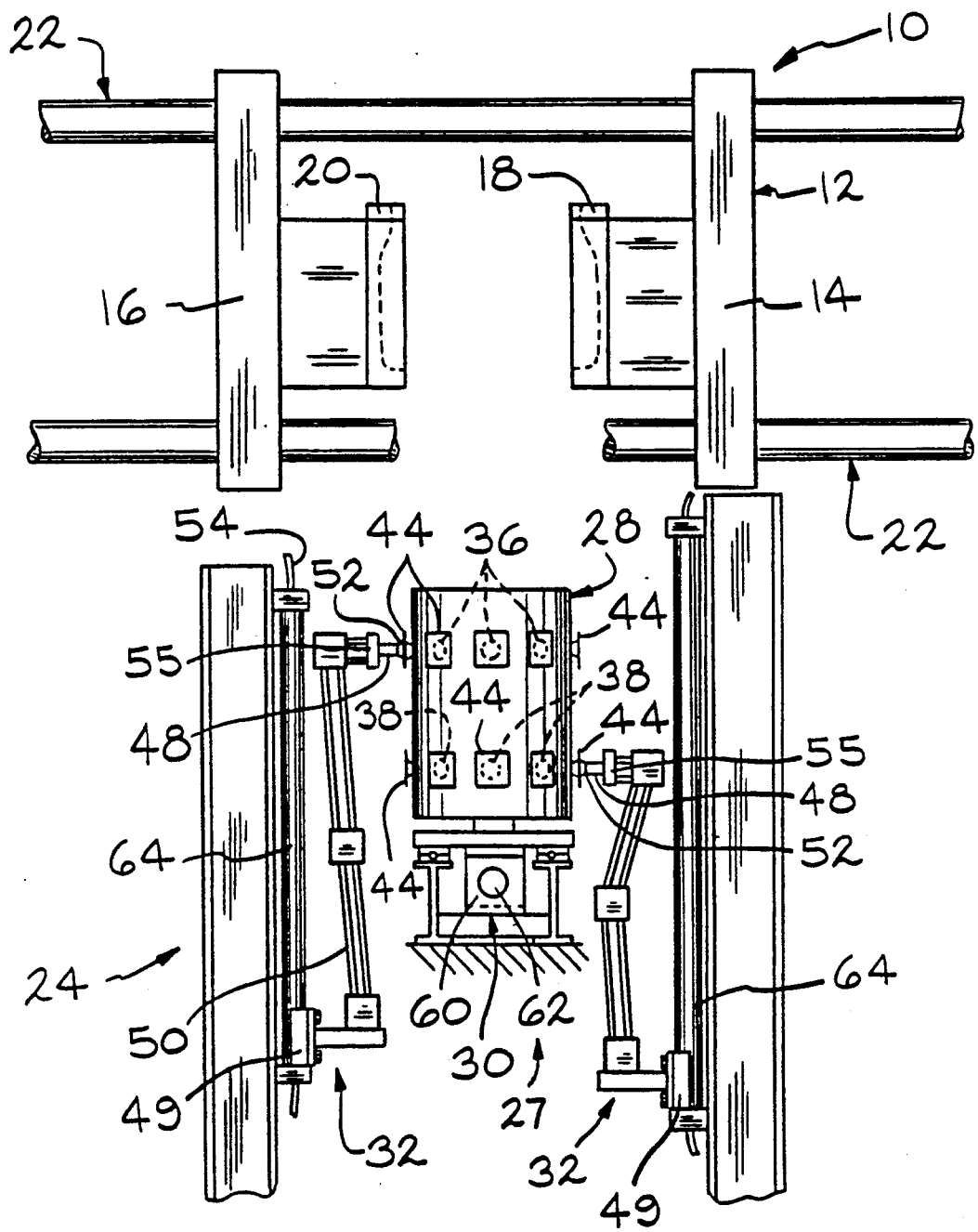
FIG. 2 is an end elevational view substantially taken along line 2—2 in FIG. 1 showing an embodiment of the present invention.
Figure 3:
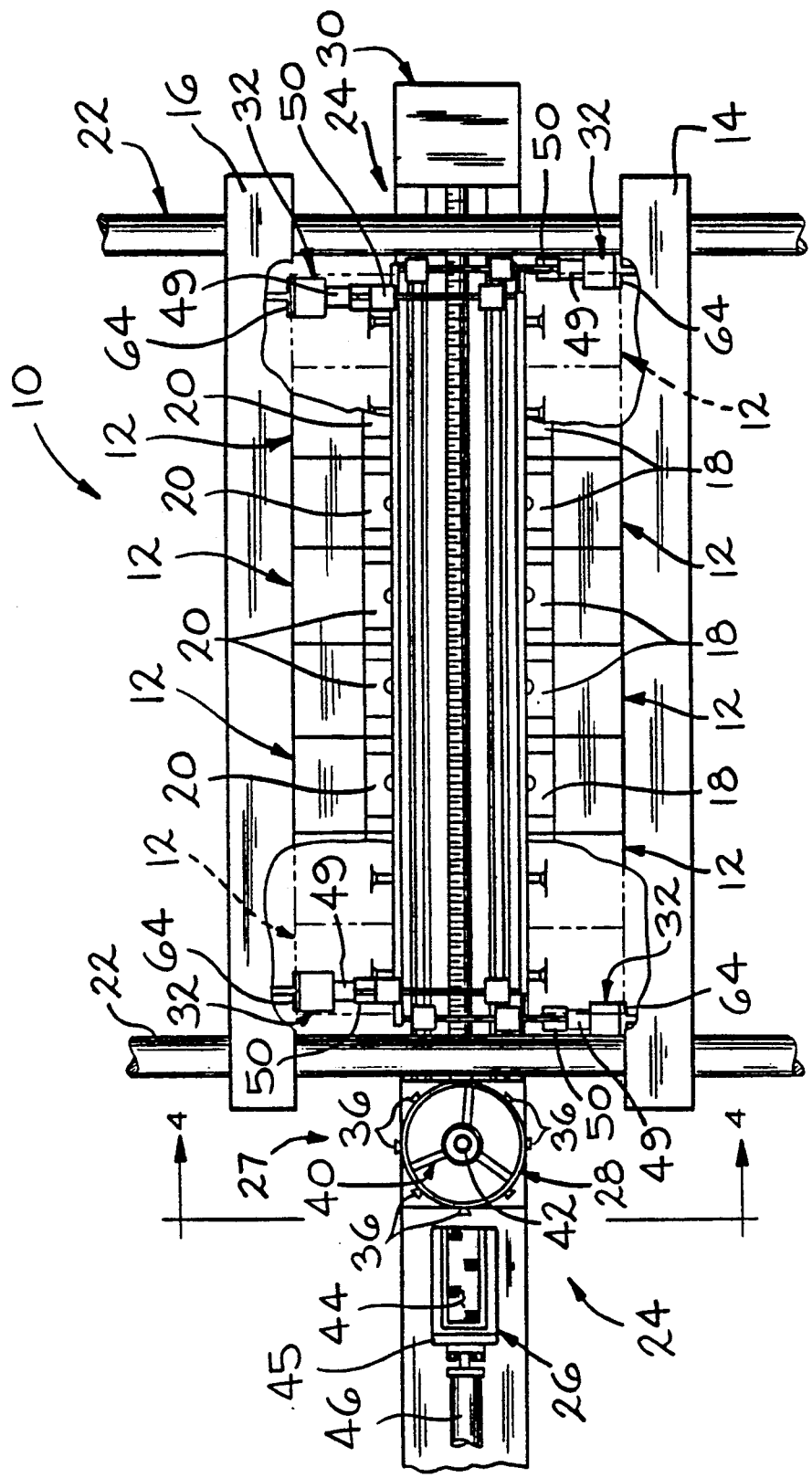
FIG. 3 is a plan view of the blow molding machine illustrated in FIG. 1 and showing the labels being placed onto the mold halves.

The placement assemblies 32 each generally include a plurality of label holding means or vacuum heads 48 articulately coupled to a labeling head 49 by a placement arm 50. The placement arm 50 is pivotable from a retracted position (not shown) to a first extended position, as seen in FIG. 2, where a vacuum head 48 will engage a label 44 being held on the transfer drum 28. To facilitate the transfer of the labels 44 from the transfer drum 28, the vacuum heads 48 are also provided with vacuum cups 52. These vacuum cups 52 are connected to a vacuum system 54 of the placement assemblies 32. Thus, the placement assembly vacuum system 54 will be activated as the transfer drum vacuum system 40 is deactivated.

Once a label 44 has been engaged by a vacuum head 48, the placement arm 50 retracts, the lower carriage 30 moves the transfer drum 28 to the next set of vacuum heads 48 in the series, and the stepping motor 42 indexes the transfer drum 28. In this manner, the labels 44 are successively provided from the transfer drum 28 to all of the vacuum heads 48 of the placement assembly 32. Once all of the labels 44 have been transferred to the placement arms 50, the transfer drum 28 may be moved by the lower carriage 30 to its initial position where it is reloaded with labels 44 from the label storage magazine 26 enabling the entire sequence to be repeated shortly after blow molding has been completed.

The vacuum heads 48 are carried by the placement arms 50 on a link or armature 55 which extends approximately the length of the blow molding machine 10. By employing the armature 55, a minimum number of placement arms 50 are needed, preferably two, one at each end of the armature 55.

Figure 4:
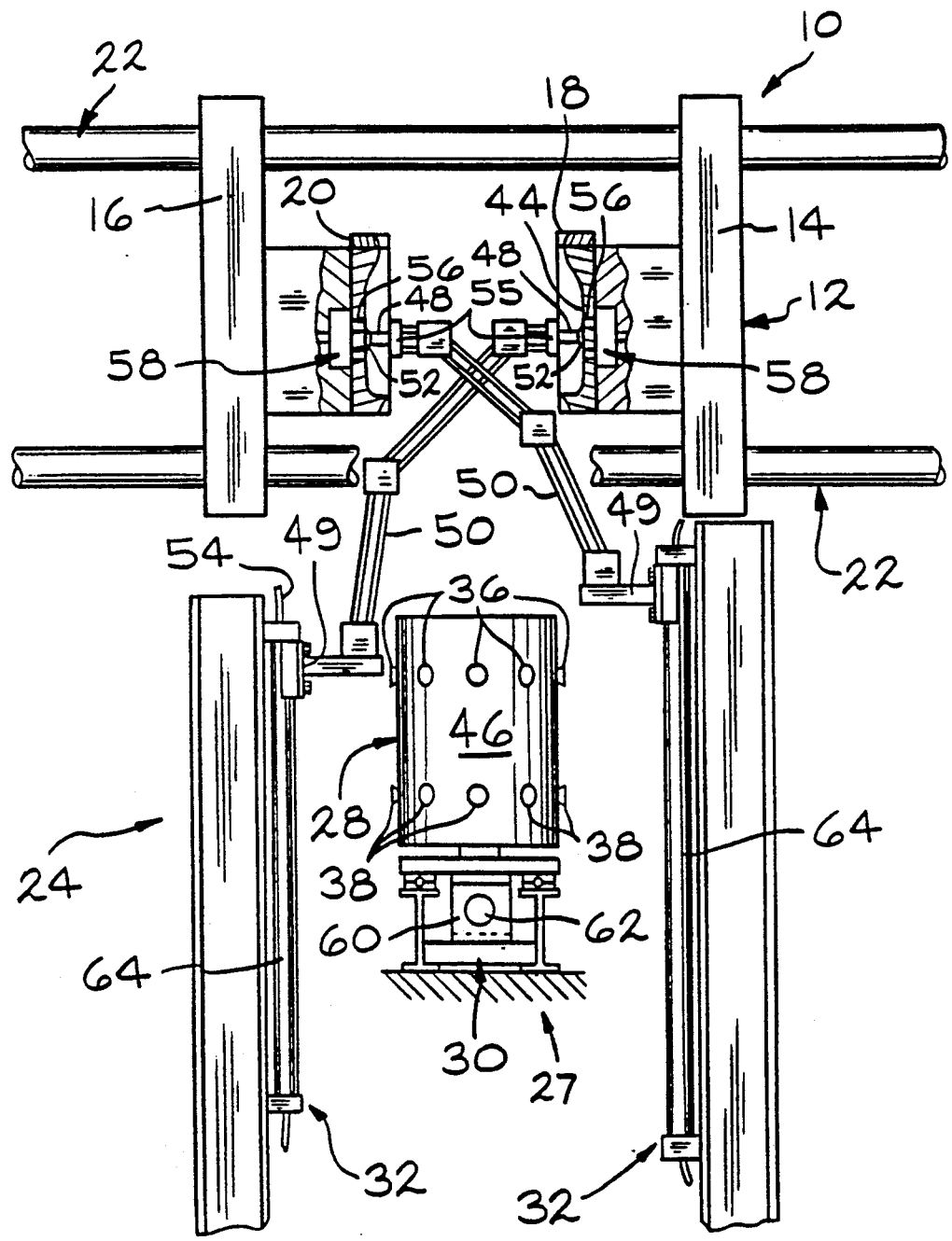
FIG. 4 is an end elevational view taken substantially along line 4—4 in FIG. 3 also showing the depositing of the labels onto the mold halves.

To place the labels 44 in position on their respective mold halves 18 and 20, the placement arms 50 and vacuum heads 48 are raised upwardly by the labeling heads 49 to an upper position. When raised, the vacuum heads 48 generally correspond in height to the blow molding stations 12. The vacuum heads 48 are extended by the placement arms 50 to a second extended position (see FIG. 4) where the labels 44 are placed onto the cavity surface of a mold half 18 or 20.

In raising the placement arms 50, the labeling heads 49 are driven upwardly along a substantially vertical rail 64 by a mechanical drive system (not shown) which will raise, and subsequently lower, the placement arms 50. Other suitable methods or mechanisms could be utilized including pneumatic systems and hydraulic systems.

The labels 44 are received from the vacuum heads 48 onto the interior surfaces of the mold halves 18 and 20 and maintained thereon by vacuum ports 56 formed in the mold halves 18 and 20. The vacuum ports 56 are in communication with a vacuum system 58 of the blow molding machine 10. After the labels 44 have been transferred to the mold halves 18 and 20, the placement arms 50 retract the vacuum heads 48 and are lowered by the labeling heads 49 to a position where they may be reloaded with labels 44.

Once the labels have been appropriately placed within the cavities of the mold halves 18 and 20, the platens 14 and 16 are clamped together by the upper carriage assembly 22 around the parison or preform. As the parison or preform is inflated by gas pressure to form the article, the label becomes fused onto the article outer surface.

To move the transfer drum 28 along the placement assemblies 32, the lower carriage 30 is provided with a drive mechanism. In the preferred embodiment, a second stepping motor 60 turns a ball screw 62 which is coupled to provide longitudinal movement to the transfer drum 28. This, in cooperation with the first stepping motor 42, simplifies the applicability of the present invention to various blow molding machines by allowing the number of labeling and blow molding stations 12 to be altered while only requiring a simple modification in the operational programs of the stepping motors 42 and 60. Additionally, by using the stepping motors 42 and 60, the vacuum cups 36 and 38 and the blow molding stations 12 need not be equidistantly spaced apart. The operational programs of the stepping motors 42 and 60 can be easily modified to compensate for any such irregularities in spacing.

While the above description constitutes the preferred embodiment of the present invention, it will be appreciated that the invention is susceptible to modification, variation and change without departing from the proper scope and fair meaning of the accompanying claims.

We claim:

1. A label transfer assembly for an in-mold labeling machine, said label transfer assembly including a label storage magazine having means for dispensing labels therefrom, a plurality of side-by-side molding stations and a placement assembly which receives labels and places the labels within the molding stations, said label transfer assembly comprising:
   a label carrier including a rotatable drum, said drum having means for receiving a plurality of individual labels thereon, said receiving means being positioned on said label carrier and being capable of receiving a plurality of individual labels from the label storage magazine generally corresponding in number to the plurality of side-by-side molding stations; and
   actuation means for moving said label carrier between a first position adjacent to the label storage magazine wherein labels are received therefrom by said receiving means and subsequent positions adjacent to the placement assembly wherein labels are individually transferable thereto for placement in the molding stations.

2. A label transfer assembly as set forth in claim 1 wherein said actuation means moves said label carrier generally longitudinally along the placement assembly.

3. A label transfer assembly as set forth in claim 2 wherein said longitudinal movement is periodically interrupted.

4. A label transfer assembly as set forth in claim 1 wherein said actuation means moves said label carrier substantially parallel to the molding stations.

5. A label transfer assembly as set forth in claim 1 wherein said actuation means includes means for rotating said label carrier.

6. A label transfer assembly as set forth in claim 5 wherein said rotation means rotates said label carrier through a plurality of indexed positions.

7. A label transfer assembly as set forth in claim 6 wherein said plurality of indexed positions correspond to the plurality of individual labels received by said receiving means.

8. A label transfer assembly as set forth in claim 1 wherein said label carrier is generally cylindrical.

9. A label transfer assembly as set forth in claim 1 wherein said receiving means includes a plurality of vacuum cups.

10. A label transfer assembly as set forth in claim 9 wherein said vacuum cups are substantially equidistantly positioned around said label carrier.

11. A label transfer assembly as set forth in claim 10 wherein said vacuum cups are generally spaced apart forming rows.

12. A label transfer assembly as set forth in claim 11 wherein said vacuum cups are also vertically spaced apart forming generally horizontal rows.

13. A label transfer assembly as set forth in claim 12 wherein said vacuum cups form two rows.

14. An in-mold label transfer mechanism for placing a label onto a mold cavity surface of a blow molding machine such that the label becomes bonded to the surface of an article molded therein, said label transfer mechanism comprising:
   a label storage magazine including means for individually dispensing labels from said label storage magazine;
   a placement assembly including a placement arm, a plurality of label holding members being coupled to one end of said placement arm, said placement arm being extendable to a first position in which said label holding members are positioned for receiving labels, said placement arm also being extendable to a second position in which said label holding members are positioned for placing labels onto the mold cavity surface; and
   a label carrier comprising a rotatable transfer drum including means for individually receiving a plurality of labels, said label carrier being movable between a first position adjacent to said label storage magazine wherein labels can be received therefrom and subsequent positions along and adjacent said placement assembly wherein labels can be transferred thereto, said label carrier including means for rotating said label carrier through a plurality of indexed positions corresponding to said plurality of holding members, said label carrier being longitudinally movable along said placement assembly, said longitudinal movement being periodically interrupted and said label carrier being successively indexed during said interruptions permitting the transfer of a label from said label carrier to one of said label holding members.

15. An in-mold label transfer mechanism as set forth in claim 14 wherein said label carrier is rotatable about a generally vertical axis.

16. An in-mold label transfer mechanism as set forth in claim 14 wherein said receiving means are substantially equidistantly positioned around said label carrier.

17. An in-mold label transfer mechanism as set forth in claim 16 wherein said receiving means are positioned in a generally horizontal row.

18. An in-mold label transfer mechanism as set forth in claim 14 wherein said label receiving means are vacuum cups.

19. An in-mold label transfer mechanism as set forth in claim 18 wherein said vacuum cups are connected to a vacuum system providing a vacuum for holding the labels.

* * * * *